US009853492B2

United States Patent
Castillo et al.

(10) Patent No.: US 9,853,492 B2
(45) Date of Patent: Dec. 26, 2017

(54) AUTOMATIC TRANSFER SWITCH MODULE

(71) Applicant: Hewlett-Packard Development Company, L.P., Houston, TX (US)

(72) Inventors: Samantha Jean Castillo, Spring, TX (US); David Paul Mohr, Spring, TX (US); Daniel Humphrey, Cypress, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 209 days.

(21) Appl. No.: 14/787,415

(22) PCT Filed: Jun. 18, 2013

(86) PCT No.: PCT/US2013/046273
§ 371 (c)(1),
(2) Date: Oct. 27, 2015

(87) PCT Pub. No.: WO2014/204441
PCT Pub. Date: Dec. 24, 2014

(65) Prior Publication Data
US 2016/0118802 A1  Apr. 28, 2016

(51) Int. Cl.
*H02J 9/06* (2006.01)
*G06F 1/30* (2006.01)
*H02J 4/00* (2006.01)

(52) U.S. Cl.
CPC ............... *H02J 9/06* (2013.01); *G06F 1/30* (2013.01); *H02J 4/00* (2013.01)

(58) Field of Classification Search
CPC ....... G06F 1/30; H02J 4/00; H02J 9/06; H02J 9/061; H02J 2009/068

USPC .......... 307/18, 23, 29, 43, 64, 65, 80, 85, 86
See application file for complete search history.

(56) References Cited

U.S. PATENT DOCUMENTS

| 8,559,167 | B1* | 10/2013 | Czarnecki | H02B 1/46 174/50 |
|---|---|---|---|---|
| 8,907,520 | B2* | 12/2014 | Chapel | H02J 9/06 307/23 |
| 9,081,568 | B1* | 7/2015 | Ross | G06F 1/3203 |
| 9,122,466 | B1* | 9/2015 | Kellett | G06F 1/26 |
| 2008/0088182 | A1* | 4/2008 | Lathrop | H02J 9/06 307/64 |
| 2008/0317021 | A1 | 12/2008 | Ives et al. | |
| 2009/0147459 | A1 | 6/2009 | Nguyen et al. | |

(Continued)

FOREIGN PATENT DOCUMENTS

JP 2008-228543 A 9/2008
KR 10-2009-0121443 A 11/2009

OTHER PUBLICATIONS

PCT Search Report/Written Opinion ~ Application No: PCT/US2013/046273 dated Mar. 24, 2014 ~ 12 pages.

(Continued)

*Primary Examiner* — William Hernandez
(74) *Attorney, Agent, or Firm* — Brooks, Cameron & Huebsch, PLLC

(57) ABSTRACT

An automatic transfer switch module includes an automatic transfer switch. The automatic transfer switch may receive a first power from a first power source and a second power from a second power source. The automatic transfer switch may selectively provide one of the first power and the second power to a power supply module.

14 Claims, 7 Drawing Sheets

(56) References Cited

U.S. PATENT DOCUMENTS

| | | |
|---|---|---|
| 2010/0019574 A1 | 1/2010 | Baldassarre et al. |
| 2010/0141038 A1* | 6/2010 | Chapel ................ H01R 25/003 |
| | | 307/64 |
| 2011/0215645 A1 | 9/2011 | Schomburg et al. |
| 2011/0245988 A1 | 10/2011 | Ingels et al. |
| 2012/0181869 A1 | 7/2012 | Chapel et al. |
| 2012/0267957 A1 | 10/2012 | Czarnecki |
| 2012/0299381 A1 | 11/2012 | Larson |
| 2015/0123473 A1* | 5/2015 | Braylovskiy ........... H02J 9/061 |
| | | 307/23 |

OTHER PUBLICATIONS

Tate: Redundant Power Automatic Transfer Switch for Poweraire; http://tateinc.com/produts/poweraire_redundent_power.aspx >, Retrieved from Internet Nov. 31, 2013.

* cited by examiner

AUTOMATIC TRANSFER SWITCH MODULE

BACKGROUND

An automatic transfer switch may receive power from multiple power sources. The automatic transfer switch may also automatically provide a respective power received by a respective one of the multiple power sources to a load.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

Figure 1:
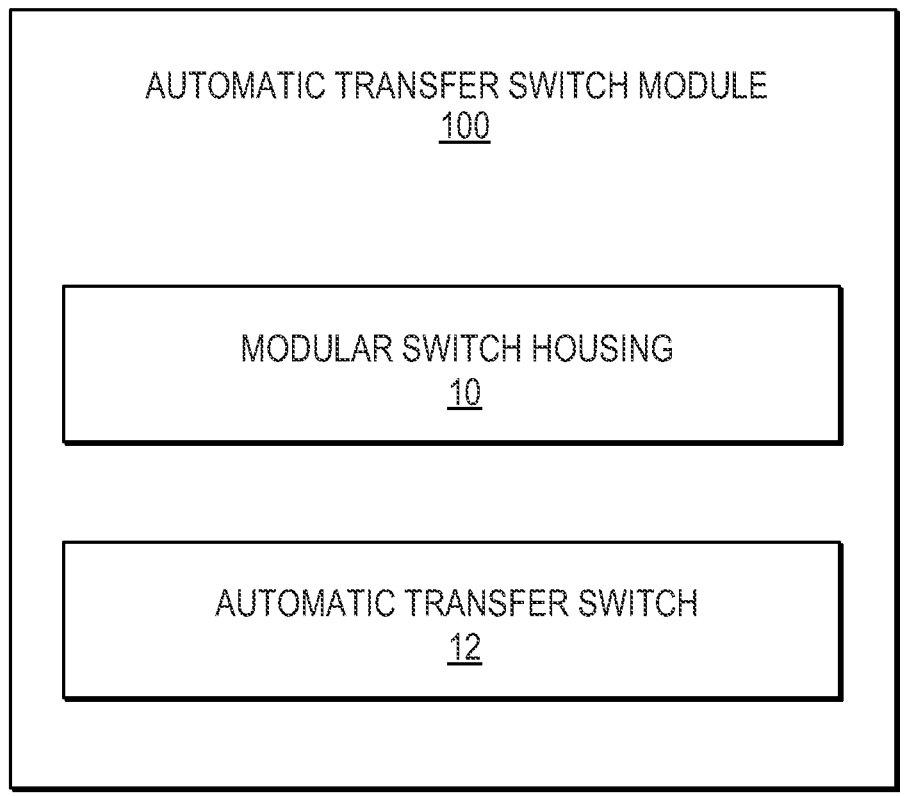
FIG. 1 is a block diagram illustrating an automatic transfer switch module according to an example.

An automatic transfer switch (ATS) may receive power from multiple power sources such as a first power source and a second power source. The automatic transfer switch may also automatically provide a respective power received by one of the first power source and the second power source to a load such as a power supply module. For example, if a first power source incurs a failure and stops providing power to the automatic transfer switch, the automatic transfer switch may automatically direct a respective power it receives from the second power source to the power supply module. Thus, redundant sources to provide power may be available to a load without requiring multiple power supply modules.

The power supply module, for example, may be inserted into a redundant power supply bay to power a computer server. A plurality of redundant power supply bays to receive respective power supply modules may be included in a housing of a computer server, and/or a server rack structure, and the like. The automatic transfer switch, for example, may be connected to the power supply module through a dongle and/or many loosely hanging wires. Accordingly, the coupling of the automatic transfer switch to the power supply module through dongles and/or many hanging wires may result in increased space demands, automatic transfer switch installation/removal time, and the like.

In examples an automatic transfer switch module may include a modular switch housing, an automatic transfer switch, and a control module. The modular switch housing may removably fit into a redundant power supply bay of an electrical system. The automatic transfer switch may be disposed in the modular switch housing, and receive a first power from a first power source and a second power from a second power source. The automatic transfer switch may also selectively provide one of the first power and the second power to the power supply module. For example, if the first power source drops out, the second power source may be directed to the power supply module. Thus, the automatic transfer switch module may increase reliability of supplying power in a cost-effective manner without increasing a number of power supply modules such as in a 1 plus 1 power supply setup. Accordingly, the ability of the automatic transfer switch module to be inserted into the redundant power supply module may decrease space demands, automatic transfer switch module installation/removal time, and the like. That is, a form factor that uses an already available redundant slot of a server system in place of a power supply module may eliminate a need for a doggie extending out a back of a server rack structure.

The control module may identify a power supply fault event corresponding to a malfunctioning power supply state, and communicate information with at least one of the power supply module and the electrical system in a standby state in response to an identification of the power supply fault event. For example, the control module may communicate information relating to the power supply failure event such as providing instantaneous event log information in a timely manner. Accordingly, the automatic transfer switch module may decrease system down time, and an amount and cost of diagnostic time in response to a power supply failure event.

FIG. 1 is a bock diagram illustrating an automatic transfer switch module according to an example. The automatic transfer switch module 100 may be usable with a power supply module to power a load of an electrical system. Referring to FIG. 1, in some examples, the automatic transfer switch module 100 includes a modular switch housing 10 and an automatic transfer switch 12 disposed in the modular switch housing 10. The modular switch housing 10 may removably fit into a redundant power supply bay of the electrical system. For example, redundant power supply bays may be standardized receptacles having a size and shape to receive power supply modules. In some examples, the modular switch housing 10 (and power supply modules) may correspond to a common slot form factor having a compatible design, shape and form factor to be received by redundant power supply bays 44a. For example, the modular switch housing 10 may include a standard form factor including a standard length, width and height.

Referring to FIG. 1, in some examples, the electrical system may include a computer server and/or a computer server system. The automatic transfer switch 12 may receive a first power from a first power source and a second power from a second power source. The automatic transfer switch 12 may also selectively provide one of the first power and the second power to the power supply module.

Figure 2:
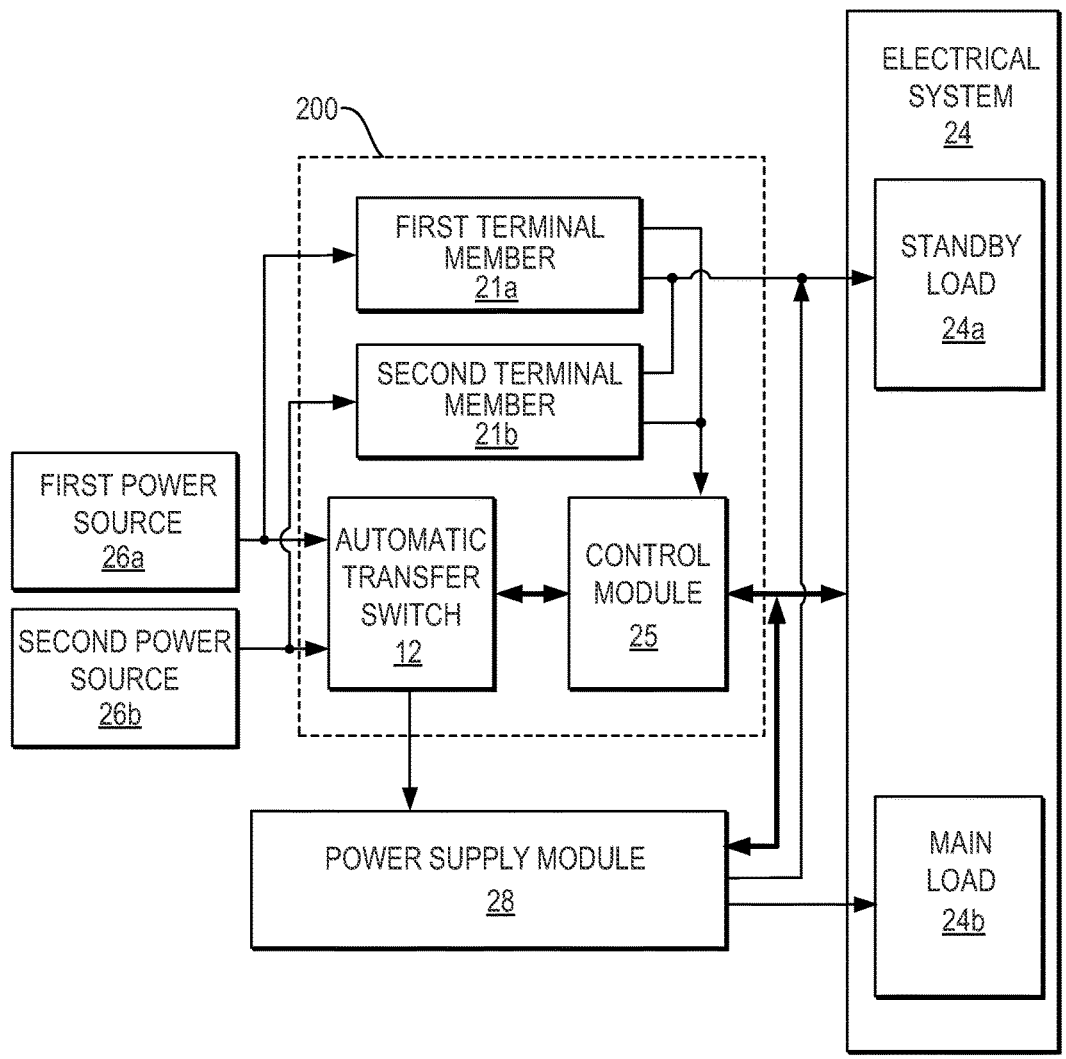
FIG. 2 is a schematic view of an automatic transfer switch module in communication with a power supply module and an electrical system according to an example.
Figure 3:
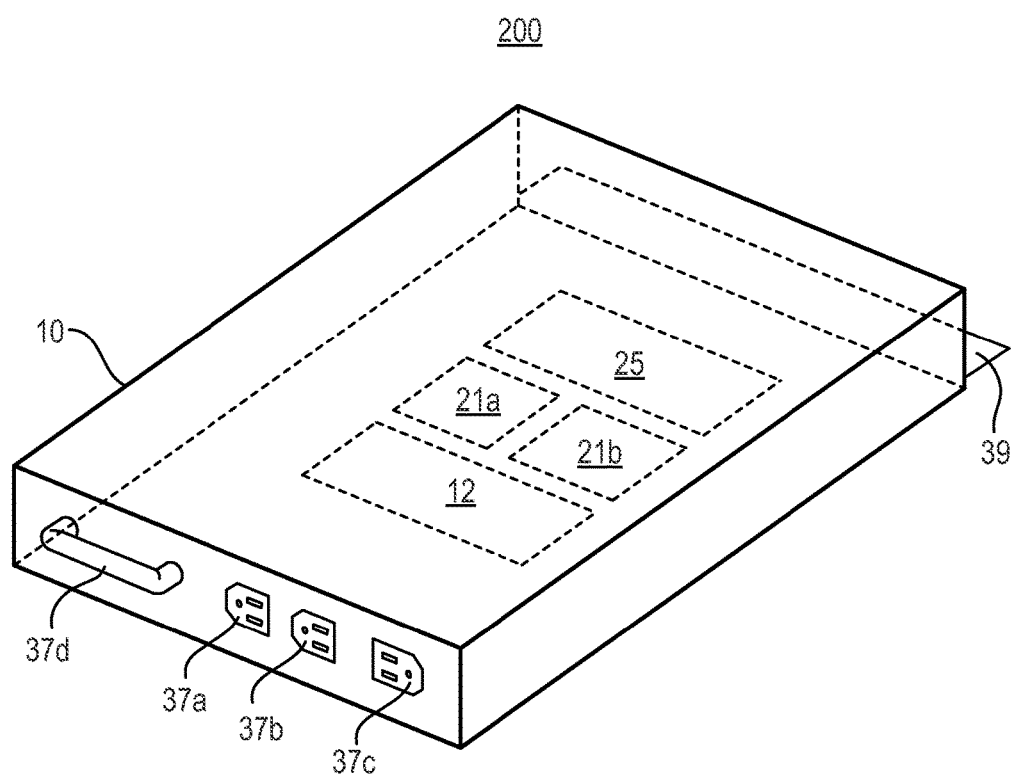
FIG. 3 is a perspective view of a modular switch housing of the automatic transfer switch module of FIG. 2 according to an example.
Figure 4:
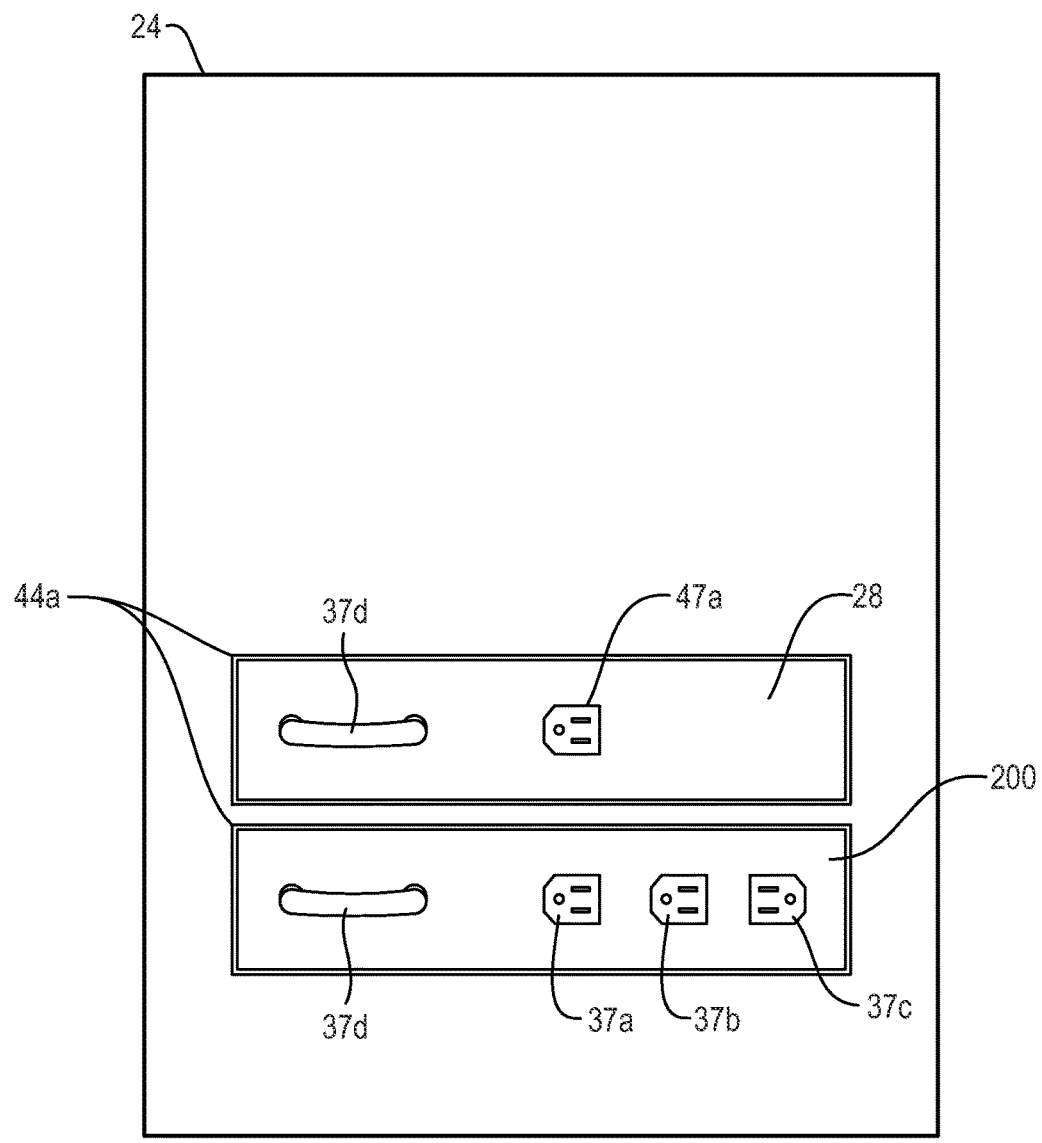
FIG. 4 is a schematic view of the automatic transfer switch module of FIG. 2 and a power supply module installed in redundant power supply bays according to an example.

FIG. 2 is a schematic view of an automatic transfer switch module in communication with a power supply module and an electrical system according to an example. FIG. 3 is a perspective view of a modular switch housing of the automatic transfer switch module of FIG. 2 according to an example. FIG. 4 is a schematic view of the automatic transfer switch module of FIG. 2 and a power supply module installed in redundant power supply bays according to an example. Referring to FIGS. 2-4, in some examples, an automatic transfer switch module 200 may include the modular switch housing 10 and the automatic transfer switch 12 of the automatic transfer switch module 100 of FIG. 1 as previously discussed. The automatic transfer switch module 200 may also include a first terminal member 21a, a second terminal member 21b, and a control module 25. The automatic transfer switch module 200 may be usable with a power supply module 28 to power a load of an electrical system 24. In some examples, the load of the electrical system 24 may be a main load 24a of a computer server and/or computer server system. Additionally, the load may be a standby load 24b of the computer server, computer server system, and/or power supply module 28.

Referring to FIGS. 2-4, in some examples, the modular switch housing 10 may removably fit into a redundant power supply bay 44a of the electrical system 24. The automatic transfer switch 12 may receive a first power from a first power source 26a and a second power from a second power source 26b. For example, the first power source 26a may connect to a first input connector 37a and the second power source 26b may connect to a second input connector 37b on the modular switch housing 10. The automatic transfer switch 12 may also selectively provide one of the first power and the second power to the power supply module 28. For example, a first output connector 37c of the modular switch housing 10 and a power supply input connector 47a may be coupled with each other through a cable (not illustrated).

In some examples, the respective connectors 37a, 37b, 37c and 47a may include various types of connectors compatible with a power signal such as an International Electrotechnical Commission appliance connector, and the like. In some examples, the modular switch housing 10 and the power supply module may also include a bay electrical connector 39 to electrically connect with a corresponding electrical connector in a respective redundant power supply bay 44a. The bay electrical connector 39 may be a standard connector disposed in a standard position to facilitate uniformity and to blindly mate with a corresponding electrical connector in the redundant power supply bay 44a.

Referring to FIGS. 2-4, in some examples, the first terminal member 21a may receive a first bias voltage from the first power source 26a. The second terminal member 21b may receive a second bias voltage from a second power source 26b. At least one of the first terminal member 21a may apply the first bias voltage and the second terminal member 21b may apply the second bias voltage to a standby load 24a of the electrical system 24. In some examples, at least one of the first terminal member 21a and the second terminal member 21b may apply respective voltages to the standby load either directly or indirectly through the power supply module 28. Thus, the automatic transfer switch module 200 may include a fail-safe capability to provide sufficient power to maintain a standby state during a power supply fault event. In some examples, the automatic transfer switch module 200 and the power supply module 28 may include a handle 37d to facilitate insertion into and removal from the redundant power supply bays 44a.

Referring to FIGS. 2-4, in some examples, the control module 25 may be disposed in the modular switch housing 10 and identify a power supply fault event corresponding to a malfunctioning power supply state. For example, a malfunctioning power supply state may correspond to a failing component or an attempt to use a power supply outside a specified operation region. Consequently, in some examples, such a malfunctioning power supply state may result in protection circuits latching off the power supply. The control module 25 may also communicate information with at least one of the power supply module 28 and the electrical system 24 in a standby state in response to an identification of the power supply fault event. The control module 25 may also receive at least one of the first bias voltage through the first terminal member 21a and the second bias voltage through the second terminal member 21b.

Referring to FIGS. 2-4, in some examples, the control module 25 may monitor the first power source 26a and the second power source 26b and determine which one of the first power and the second power is provided to the power supply module 28 by the automatic transfer switch 12. Further, the control module 25 may communicate which one of the first power and the second power is provided to the power supply module 28 to at least one of the power supply module 28 and the electrical system 24 in response to the identification of the power supply fault event. The control module 25 may also access an event log corresponding to the power supply module 28 to obtain power supply diagnostic information in response to the identification of the power supply fault event. In some examples, the control module 25 may communicate through a communication bus. For example, communication may be facilitated through inter-integrated circuit ($i^2C$), Universal Asynchronous Receiver/Transmitter (UART), and/or RS-232, and the like.

The control module 25 may be implemented in hardware, software including firmware, or combinations thereof. For example, the firmware may be stored in memory and executed by a suitable instruction-execution system. If implemented in hardware, as in an alternative example, the control module 25 may be implemented with any or a combination of technologies which are well known in the art (for example, discrete-logic circuits, application-specific integrated circuits (ASICs), programmable-gate arrays (PGAs), field-programmable gate arrays (FPGAs)), and/or other later developed technologies. In some examples, control module 25 may be implemented in a combination of software and data executed and stored under the control of a computing device.

Figure 5:
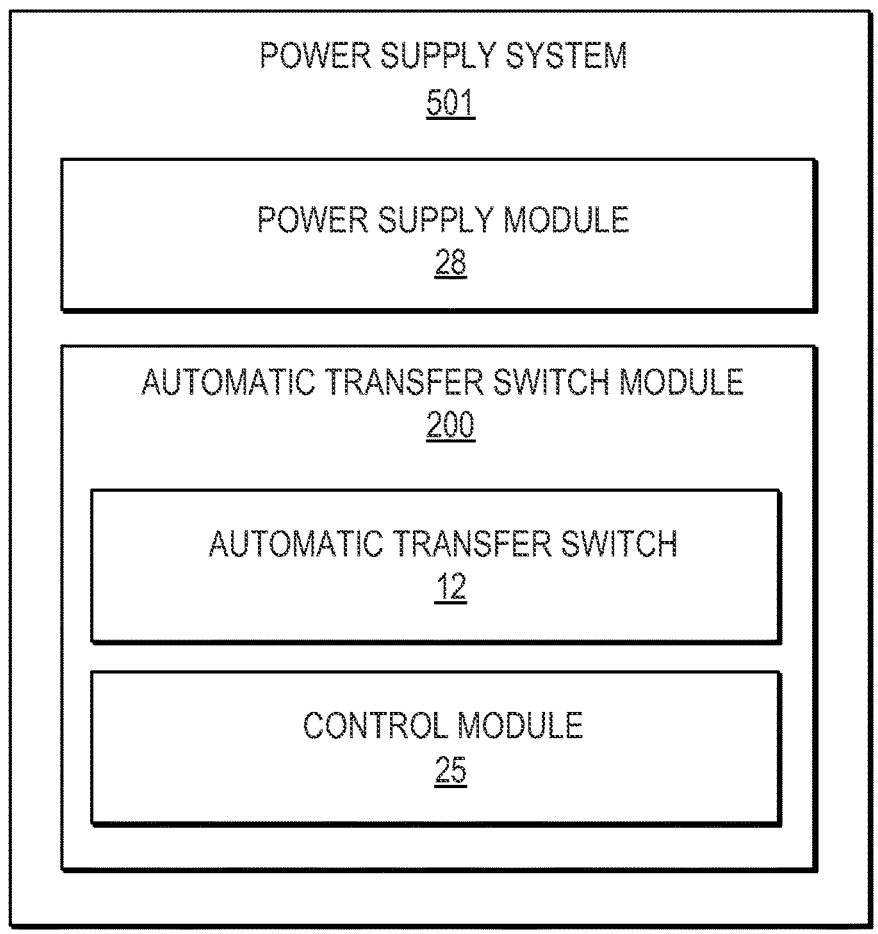
FIG. 5 is a bock diagram of a power supply system according to an example.

FIG. 5 is a block diagram of a power supply system according to an example. The power supply system 501 may be usable with a computer server system. Referring to FIG. 5, in some examples, the power supply system 501 may include a power supply module 28 and an automatic transfer switch module 200. The automatic transfer switch module 200 may include an automatic transfer switch 12 and a control module 25. The power supply module 28 may provide power to a respective computer server of the computer server system. The automatic transfer switch 12 may receive a first power from the first power source and a second power from the second power source. The automatic transfer switch 12 may also selectively provide one of the first power and the second power to the power supply module 28. The control module 25 may identify a power supply fault event corresponding to a malfunctioning power supply state. The control module 25 may also communicate information with at least one of the power supply module 28 and the computer server system in a standby state in response to an identification of the power supply fault event.

Figure 6:
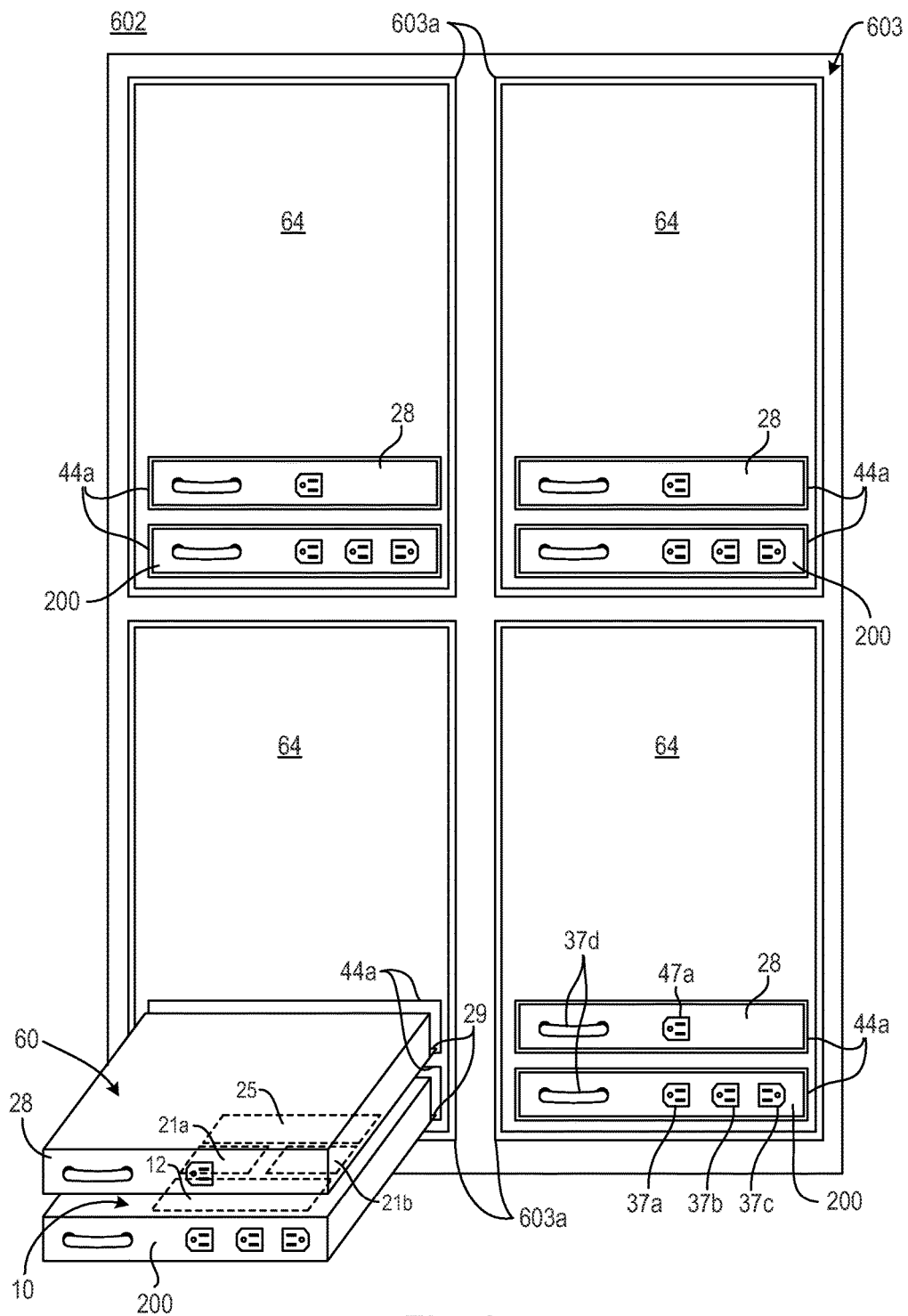
FIG. 6 is a schematic view illustrating a power supply system usable with a computer server system according to an example.

FIG. 6 is a schematic view illustrating a power supply system usable with a computer server system according to an example. Referring to FIGS. 5 and 6, in some examples, the power supply system 501 may include the power supply module 28 and the automatic transfer switch module 200 including the automatic transfer switch 12 and the control module 25 of FIG. 5 as previously discussed. The power supply system 501 may be usable with a computer server system 602. In some examples, the computer server system 602 may include a server rack structure 603 including a plurality of server bays 603a, a plurality of computer servers 64 having redundant power supply bays 44a, power supply modules 28 to be removably installed in the redundant power supply bays 44a, automatic transfer switch modules 200 to be removably inserted in the redundant power supply bays 44a, and/or a main central processing unit (not illustrated) to communicate with the computer servers 64, and the like. In some examples, the computer server system 602 may provide combined computational and processing power of the computer servers 64 installed in the server rack structure 603.

Referring to FIGS. 5 and 6, in some examples, the automatic transfer switch modules 200 may include modular switch housings 10 including a respective handle 37d, and respective connectors 37a, 37b, 37c and 39 as previously discussed with respect to FIGS. 1-3. The power supply modules 28 may include power modular supply housings 60 including a respective handle 37d and respective connectors 47a and 39 as previously discussed with respect to FIGS. 1-3. Each one of the modular switch housings 10 and the modular supply housings 60 may interchangeably fit into redundant power supply bays 44a. For example, redundant power supply bays 44a may be standardized receptacles having a size and shape to receive power supply modules 28. In some examples, the modular switch housings 10 and power supply housings 60 may correspond to a common slot form factor having a compatible design, shape and form factor to be received by redundant power supply bays 44a. For example, the modular switch housings 10 and the power supply housings 60 may include a standard form factor including a standard length, width and height.

Referring to FIGS. 5 and 6, in some examples, each one of the automatic transfer switch modules 200 may also include a first terminal member 21a and a second terminal member 21b. The first terminal member 21a may receive a first bias voltage from a first power source. The second terminal member 21b may receive a second bias voltage from a second power source. At least one of the first terminal member 21a may apply the first bias voltage and the second terminal member 21b may apply the second bias voltage to a respective computer server 64. Thus, the automatic transfer switch module 200 may include a fail-safe capability to provide sufficient power to maintain a standby state during a power supply fault event. In some examples, the control module 25 may receive at least one of the first bias voltage and the second bias voltage.

Referring to FIGS. 5 and 6, in some examples, the control module 25 may also monitor the first power source and the second power source, and determine which one of the first power and the second power is provided to the power supply module 28 by the automated transfer switch 12. The control module 25 may also communicate which one of the first power and the second power is provided to the power supply module 28 to at least one of the power supply module 28 and the computer server system 602 in response to the identification of the power supply fault event. Further, the control module 25 may access an event log corresponding to the power supply module 28 to obtain power supply diagnostic information in response to the identification of the power supply fault event.

Figure 7:
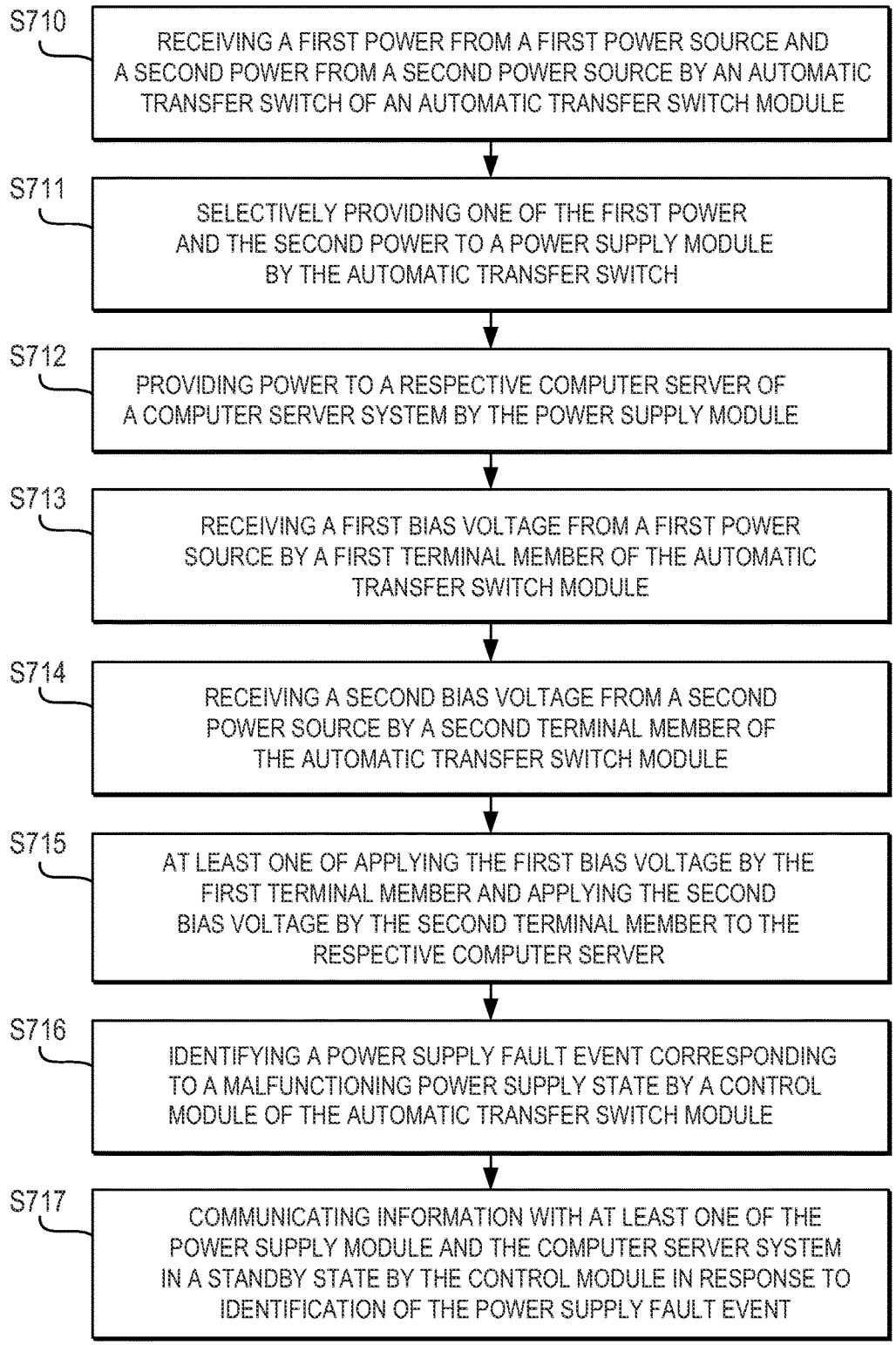
FIG. 7 is a flowchart illustrating a power supplying method according to an example.

FIG. 7 is a flowchart illustrating a power supplying method according to an example. Referring to FIG. 7, in block S710, a first power from a first power source and a second power from a second power source is received by an automatic transfer switch of an automatic transfer switch module. In block S711, one of the first power and the second power is selectively provided to a power supply module by the automatic transfer switch. In block S712, the power supply module provides power to a respective computer server of a computer server system. In block S713, a first terminal member of the automatic transfer switch module receives a first bias voltage from a first power source. In block S714, a second terminal member of the automatic transfer switch module receives a second bias voltage from a second power source.

In block S715, at least one of the first terminal member applies the first bias voltage and the second terminal member applies the second bias voltage to the respective computer server. In block S716, a control module of the automatic transfer switch module identifies a power supply fault event corresponding to a malfunctioning power supply state. In block S717, the control module communicates information with at least one of the power supply module and the computer server system in a standby state in response to identification of the power supply fault event. For example, the control module may access an event log corresponding to the power supply module to obtain power supply diagnostic information in response to the identification of the power supply fault event. The power supplying method may also include receiving at least one of the first bias voltage and the second bias voltage by the control module.

It is to be understood that the flowchart of FIG. 7 illustrates architecture, functionality, and/or operation of examples of the present disclosure. If embodied in software, each block may represent a module, segment, or portion of code that includes one or more executable instructions to implement the specified logical function(s). If embodied in hardware, each block may represent a circuit or a number of interconnected circuits to implement the specified logical function(s). Although the flowchart of FIG. 7 illustrates a specific order of execution, the order of execution may differ from that which is depicted. For example, the order of execution of two or more blocks may be rearranged relative to the order illustrated. Also, two or more blocks illustrated in succession in FIG. 7 may be executed concurrently or with partial concurrence. All such variations are within the scope of the present disclosure.

The present disclosure has been described using non-limiting detailed descriptions of examples thereof that are not intended to limit the scope of the general inventive concept. It should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. An automatic transfer switch module usable with a power supply module to power a load of an electrical system, the automatic transfer switch module comprising:

a modular switch housing to removably fit into a redundant power supply bay of the electrical system, wherein the electrical system is a computer server system; and an automatic transfer switch to receive a first power from a first power source and a second power from a second power source, and to selectively provide one of the first power and the second power to the power supply module; and wherein the automatic transfer switch is disposed in the modular switch housing.

2. The automatic transfer switch module of claim 1, further comprising:

a control module to identify a power supply fault event corresponding to a malfunctioning power supply state, and to communicate information with at least one of the power supply module and the electrical system in a standby state in response to an identification of the power supply fault event.

3. The automatic transfer switch module of claim 2, further comprising:

a first terminal member to receive a first bias voltage from the first power source, and a second terminal member to receive a second bias voltage from the second power source, at least one of the first terminal member to apply the first bias voltage and the second terminal member to apply the second bias voltage to a standby load of the electrical system.

4. The automatic transfer switch module of claim 3, wherein the control module is configured to receive at least one of the first bias voltage and the second bias voltage.

5. The automatic transfer switch module of claim 2, wherein the control module is configured to monitor the first power source and the second power source, to determine which one of the first power and the second power is provided to the power supply module by the automatic transfer switch, and to communicate which one of the first power and the second power is provided to the power supply module to at least one of the power supply module and the electrical system in response to the identification of the power supply fault event.

6. The automatic transfer switch module of claim 2, wherein the control module is configured to access an event log corresponding to the power supply module to obtain power supply diagnostic information in response to the identification of the power supply fault event.

7. The automatic transfer switch module of claim 2, wherein the control module is disposed in the modular switch housing.

8. A power supply system usable with a computer server system, comprising:

a power supply module to provide power to a respective computer server of the computer server system including a modular supply housing; and an automatic transfer switch module including a modular switch housing, an automatic transfer switch and a control module;

the modular switch housing and the modular supply housing configured to interchangeably fit into a redundant power supply bay of the computer server system;

the automatic transfer switch to receive a first power from a first power source and a second power from a second power source, and to selectively provide one of the first power and the second power to the power supply module; and the control module to identify a power supply fault event corresponding to a malfunctioning power supply state, and to communicate information with at least one of the power supply module and the computer server system in a standby state in response to an identification of the power supply fault event.

9. The power supply system of claim 8, wherein the automatic transfer switch module further comprises:

a first terminal member to receive a first bias voltage from the first power source; and a second terminal member to receive a second bias voltage from the second power source, at least one of the first terminal member to apply the first bias voltage and the second terminal member to apply the second bias voltage to the respective computer server; and wherein the control module is configured to receive at least one of the first bias voltage and the second bias voltage.

10. The power supply system of claim 8, wherein the control module is configured to monitor the first power source and the second power source, to determine which one of the first power and the second power is provided to the power supply module by the automated transfer switch, and to communicate which one of the first power and the second power is provided to the power supply module to at least one of the power supply module and the computer server system in response to the identification of the power supply fault event.

11. The power supply system of claim 8, wherein the control module is configured to access an event log corresponding to the power supply module to obtain power supply diagnostic information in response to the identification of the power supply fault event.

12. A power supplying method, comprising:

receiving a first power from a first power source and a second power from a second power source by an automatic transfer switch of an automatic transfer switch module of a computer server system;

selectively providing one of the first power and the second power to a power supply module by the automatic transfer switch;

providing power to the respective computer server of a computer server system by the power supply module;

receiving a first bias voltage from the first power source by a first terminal member of the automatic transfer switch module;

receiving a second bias voltage from the second power source by a second terminal member of the automatic transfer switch module;

at least one of applying the first bias voltage by the first terminal member and applying the second bias voltage by the second terminal member to the respective computer server;

identifying a power supply fault event corresponding to a malfunctioning power supply state by a control module of the automatic transfer switch module; and communicating information with at least one of the power supply module and the computer server system in a standby state by the control module in response to identification of the power supply fault event.

13. The power supplying method of claim 12, further comprising:

receiving at least one of the first bias voltage and the second bias voltage by the control module.

14. The power supplying method of claim 12, wherein the communicating information with at least one of the power supply module and the computer server system in a standby state by the control module in response to identification of the power supply fault event further comprises:

accessing an event log corresponding to the power supply module to obtain power supply diagnostic information in response to the identification of the power supply fault event.

* * * * *